A. SCHOEL.
DOUGHNUT MACHINE.
APPLICATION FILED JAN. 22, 1921.
1,381,850.
Patented June 14, 1921.
3 SHEETS—SHEET 1.
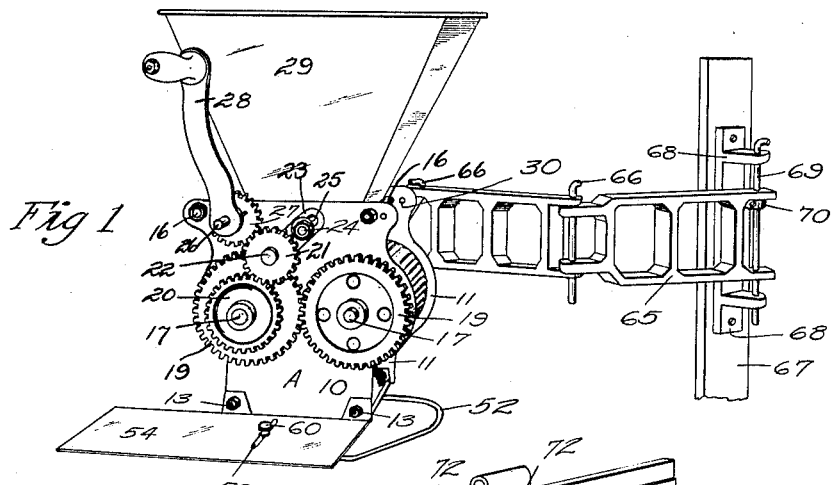
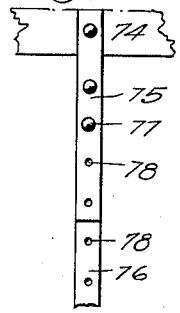
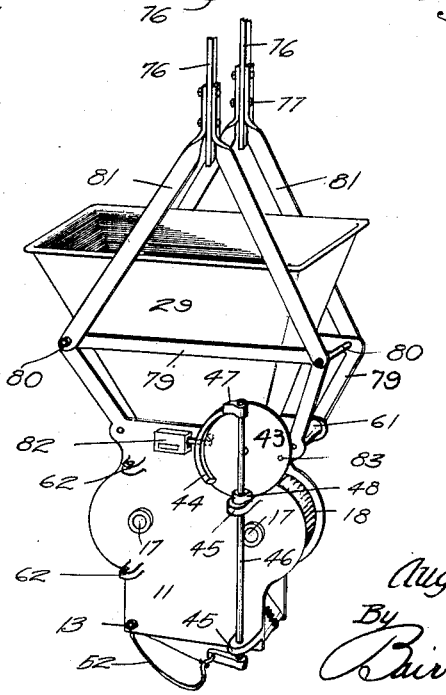
Inventor
August Schoel

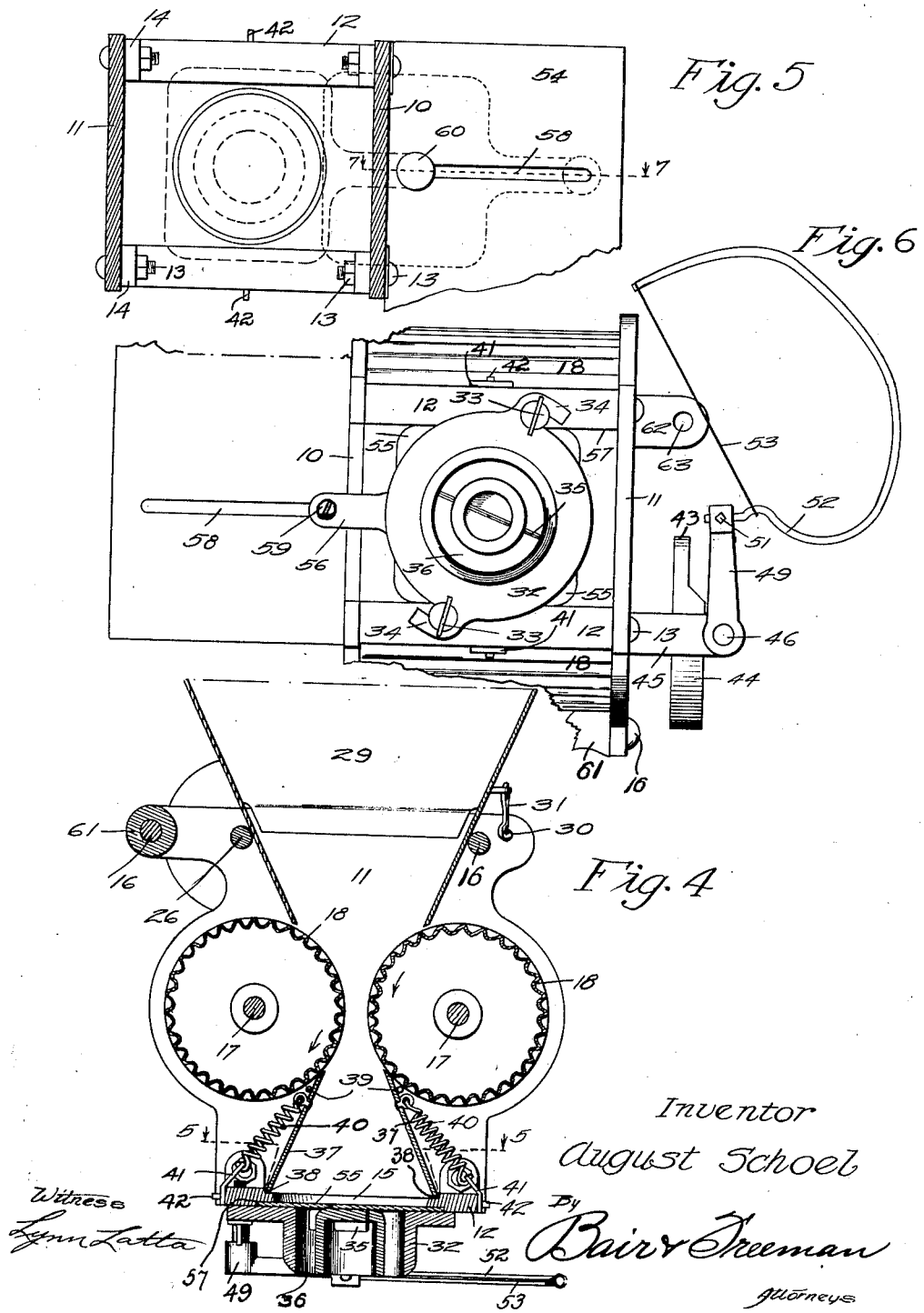

A. SCHOEL.
DOUGHNUT MACHINE.
APPLICATION FILED JAN. 22, 1921.
1,381,850.
Patented June 14, 1921.
3 SHEETS—SHEET 3.
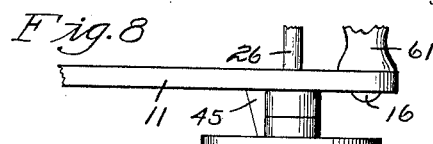
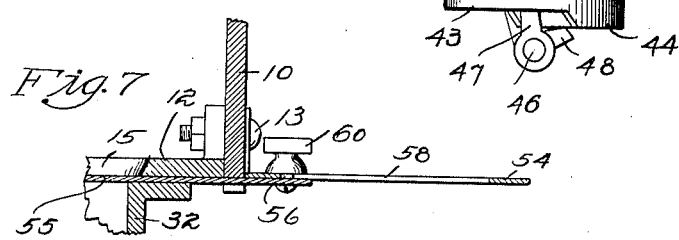
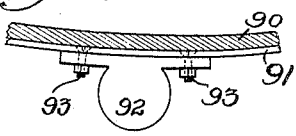
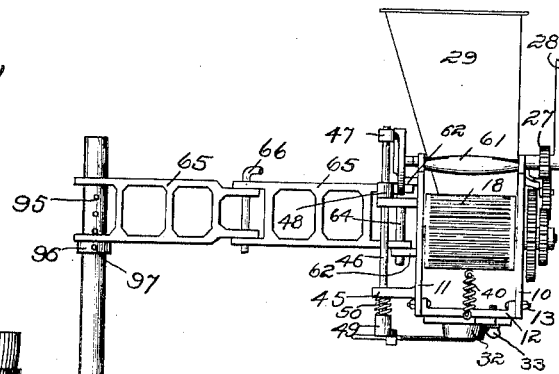
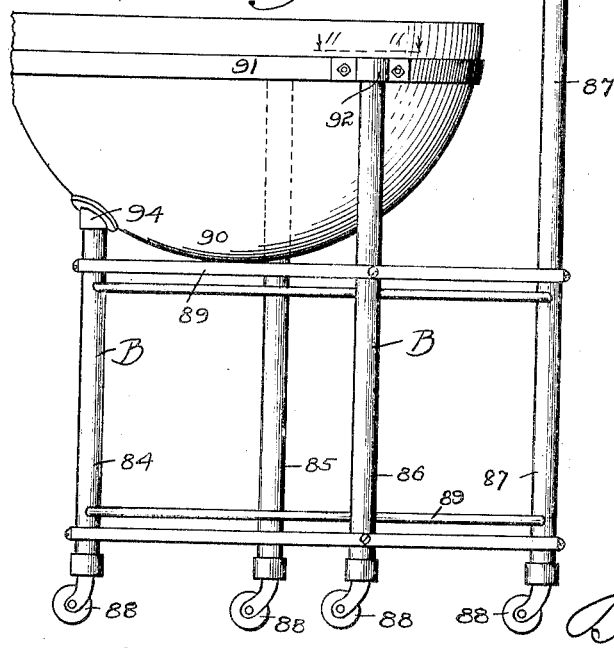
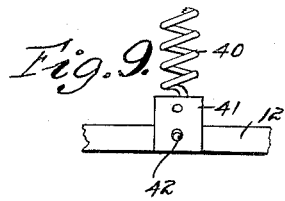
Inventor
August Schoel
By
Bair & Freeman
Attorneys

UNITED STATES PATENT OFFICE.

AUGUST SCHOEL, OF WATERLOO, IOWA, ASSIGNOR OF THREE-TENTHS TO GEORGE SCHOEL, OF WATERLOO, IOWA.

DOUGHNUT-MACHINE.

1,381,850.     Specification of Letters Patent.     Patented June 14, 1921.

Application filed January 22, 1921. Serial No. 439,109.

*To all whom it may concern:*

Be it known that I, AUGUST SCHOEL, a citizen of the United States, and a resident of Waterloo, in the county of Blackhawk and State of Iowa, have invented a certain new and useful Doughnut-Machine, of which the following is a specification.

The object of my invention is to provide a doughnut forming and cutting machine which is of comparatively simple, durable and inexpensive construction.

More particularly my invention relates to a device for forming and cutting doughnuts out of comparatively soft dough, or the like, and a cut-off device so mounted, as to easily be controlled for preventing any dough from passing through the machine when not desired.

Still another object is to provide a cutter which will pass against the lower edge of the die, which forms the doughnut, and apply a shearing cut so that all the dough will be cleared from the bottom of the die.

Still another object is to provide a pair of removable wall members which form a casing through which the dough is forced into the die. The wall members being peculiarly held in engagement so that they can readily and easily be removed for cleaning when it is desired to clean the machine.

Still another object is to provide a fender device which is fixed to one side of the machine which prevents heat from coming in contact with the arm of the operator when operating the crank for operating the machine. The fender serving as a bearing member for one end of the cutoff device.

Still another object is to provide a portable frame having a vat thereon for containing dough, and a doughnut forming and cutting machine pivotally mounted on said frame. The parts being so arranged that the doughnut forming and cutting machine may be moved above the vat of dough for filling it with dough, and then swung away from the vat when the doughnuts are being cut.

The vat is mounted on one side of the frame, while the doughnut forming and cutting machine is mounted on the opposite side, whereby the vat serves as a counterweight for balancing the doughnut machine when it is swung to various positions.

Still another object is to provide means whereby the machine may be raised or lowered as desired.

Still another object is to provide a portable frame with a doughnut forming and cutting machine mounted on one side thereof, and a vat on the other side, the vat being removably mounted so that when it is desired to be cleaned, it may be raised from said frame.

Still another object is to provide a track supported doughnut forming and cutting machine, which is capable of longitudinal movement on a track, and at the same time capable of swinging or hinged movement on a horizontal axis. The parts being so arranged that the machine may be raised or lowered relative to the track so as to be used under various conditions, and over various heights of kettles in which the doughnut when formed, is dropped.

Still another object is to provide on a machine, a registering device for indicating the number of doughnuts that are formed and cut, the registering device being tripped with each operation of the cutter.

Still another object is to provide corrugated drums for forcing dough through a die, the drums being geared together so as to operate in unison, and a crank device arranged so that it operates the drums, and at the same time operates a reciprocating cutter, so that the entire device is simultaneously operated from a single crank.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a perspective view of my machine showing the gearing arrangement, and the fender device.

Fig. 2 is a perspective view of the opposite side of the machine from that shown in Fig. 1, showing the machine suspended from a track device.

Fig. 3 is a detail view of a portion of the straps from which the machine is suspended.

Fig. 4 is a vertical, central, sectional view taken through the machine.

Fig. 5 is a detail, horizontal, sectional view taken on the line 5—5 of Fig. 4, showing the cutoff device.

Fig. 6 is a view of the underside of the machine.

Fig. 7 is a detail, sectional view taken on the line 7—7 of Fig. 5, showing the cutoff device.

Fig. 8 is a detail view of the cam which operates the reciprocating cutter.

Fig. 9 is a detail view of the spring which holds the removable wall members in position.

Fig. 10 is an end elevation of the machine in connection with a portable frame and vat thereon; and Fig. 11 is a detail, sectional view taken on the line 11—11 of Fig. 10.

In the accompanying drawings I have used the reference character A to indicate generally the frame of my machine which is a casting composed of two similar wall members 10 and 11, with a bottom 12 placed therebetween, and held to the sides by means of the bolts 13.

Ears 14 are formed on the bottom and rest against the walls 10 and 11 and through these ears 14 are extended the bolts 13.

The bottom member 12 of the frame A is provided with an opening 15, the purpose of which will be hereafter more fully set forth.

Spacing rods 16 are extended through the walls 10 and 11, and hold them against movement relative to each other.

Journaled in the walls 10 and 11 are the shafts 17 upon which are mounted corrugated drums 18. The shafts 17 have one of their ends extended beyond the side of the frame A.

Fixed to the extended end of the shafts 17 are the gears 19 which are in mesh with each other.

One of the shafts 17 is provided with a gear 20 in mesh with a gear 21. The gear 21 is mounted on a short stub shaft 22 which in turn is fixed to a sliding bearing 23. The bearing member 23 is fixed to the wall 10 by means of a bolt 24, which is received in a slot 25 in the bearing member.

A shaft 26 is journaled in the walls 10 and 11 and has each of its ends projected beyond the sides of the wall.

On one end of the shaft 26 is a gear 27 which is in mesh with the gear 21. A crank handle 28 is fixed to the shaft 26. The crank handle 28 may be rotated for imparting rotation to the gear 21, the gear 20 and the gears 19.

By sliding the bearing member 23 I am able to place gears of various sizes on the shaft 22 and have them mesh with the gears 20 and 27; by doing this I am able to vary the speed of rotation of the drums.

It will be understood that by varying the size of the gear 21, which is made possible by the sliding bearing 23, the speed of the rotation of the gears 19 may be varied relative to the rotation of the crank 28.

A hopper 29 has its lower end received between the walls 10 and 11, and rests slightly above the drums 18. The end walls of the hopper rest between one of the spacing rods 16 and the shaft 26 as illustrated in Fig. 4 of the drawings.

The walls 10 and 11 are provided with openings 30 in which is received the hook 31 which is fixed to the hopper. The hooks 31 firmly hold the hopper 29 to the frame A.

Detachably fixed to the bottom 12 and below the opening 15 is a die member 32. A pair of bolts 33 are screwed into the bottom 12. The die member 32 is provided with a pair of ears 34 which are received between the head on the bolts 33 and the under surface of the bottom member 12.

The die member 32 is in this way removably fastened to the bottom 12.

The die member 32 consists of a pair of tubular shaped members which are slightly spaced from each other and held together by a thin cross piece 35, whereby an opening 36 is formed through which the dough is forced, the opening being of the outline of a doughnut.

It will be understood that the drums 18 which are corrugated, force the dough therebetween and through the opening 15, and through the die member 32.

In order to prevent any of the dough from passing out at the sides of the machine between the bottom and the drums 18, I have provided thin plates or walls 37 which are removably, yieldingly held in position.

The bottom 12 is provided with a shoulder 38 in which is received the lower end of the plates 37. Small pins 39 serving as stops are mounted in the walls 10 and 11 and have the upper ends of the plates 37 received against them.

A spring 40 has one of its ends fixed near the upper end of the plates 37 and its lower end fixed to a small plate 41 which is in turn fixed to the bottom 12 by means of a short pin 42. The plate 41 is provided with an opening which is extended over the pin 42.

From the construction of the parts just described it will be seen that the plate 37 will be yieldingly held in position, and yet may readily be removed by forcing the upper end of the plate inward against the action of the spring until the lower end of the plate disengages the shoulder 38.

It is very advantageous to make the plates 37 removable since it is necessary to get into the interior of the device when it is desired to thoroughly clean the device.

When the dough is forced through the die 32 it is necessary to intermittently cut the dough from the die so that the complete ring or doughnut will be formed and dropped from the machine.

In order to accomplish this I have provided a reciprocating cutter device, which I will now describe in detail.

Fixed to the free end of the shaft 26 on the opposite side of the crank 28 is a disk 43 which is provided with a cam surface 44 near its edge. The cam 44 extending only a part of the distance around the disk 43.

Formed integral with the wall 11 and extending outwardly from it, are a pair of ears 45 in which is mounted a vertical shaft 46. The shaft 46 has a pair of cam engaging members 47 and 48 thereon.

Rotation of the crank handle 28 imparts rotation to the disk 43 whereby the cam engaging members 47 and 48 will be engaged by the cam 44 during each revolution of the disk 43. This causes the shaft 46 to rotate slightly in one direction and then in the opposite direction.

The lower end of the shaft 46 is provided with a short arm 49. A spring 50 is placed on the shaft 46 and rests between the lower surface of one of ears 45 and the upper surface of the arm 49.

Fixed in the arm 49 by means of a set screw 51 is a bow 52. The bow 52 is provided with a cutting wire 53. When the cutter device is operated the shaft 46 serves as a pivot or center point upon which the swinging movement of the cutter is had.

The wire 53 strikes the lower beveled edge of the die 32 and rides against the lower edge during the entire cutting stroke. In this way the dough which has been forced through the die is sheared from the die and drops in the form of a doughnut.

The fact that the wire 53 is not extended outwardly from the shaft 46 radially, tends to give a shearing stroke to the cutter device when it is operated.

When the cam 44 engages the cam engaging members 47 and 48 it causes the cutter to be reciprocated over the lower edge of the die 32.

It will be understood that, when the dough is cut from the die member by the cutter device, that they are dropped into a boiling hot kettle of grease, it is further necessary to swing the machine over the hot grease so that the dough may drop therein.

In order to prevent heat from the grease to come in contact with the operator's arm when the crank device is being operated I have provided a fender device 54 which is fixed to the wall 10 by means of the bolts 13.

In order to prevent any dough from passing through the die when not desired, I have provided a cutoff device which consists of a rectangular paddle 55 having a tongue 56 thereon.

The paddle 55 is slidably received in a recess 57 formed in the bottom 12. The paddle is received between the die 32 and the bottom 12.

The fender 54 is provided with a slot 58 which is substantially in alinement with the tongue 56. A screw 59 extends through the tongue 56 and through the slot 58 and has its upper end received in a handle or head member 60.

By engaging the handle 60 and moving it within the slot 58 the paddle 55 is moved to position shown in dotted lines in Fig. 5, so that the opening 15 in the bottom 12 is cleared so that dough may pass into the die 32.

The fender 54 serves as a bearing for one end of the cutoff device, while the two sides are held by the die 32.

From the construction of the cutoff device it will be seen that only the head 60 is in sight, and that all the parts of the device which are likely to have dough thereon are out of sight so that the machine is always kept in a neat appearance.

On the spacing rods 16 I have provided a handle 61 which rests between the walls 10 and 11. The handle 61 is designed to be engaged by one hand of the operator to keep the machine steady, while the other hand is used to operate the crank handle 28.

It will be understood that it is necessary to move the entire machine when the doughnuts are being cut so that when they drop in the grease they will not drop upon each other.

In order to make it possible to shift the position of the machine I have formed on the wall 11 a pair of lugs 62 which are provided with openings 63. A pintle rod 64 extends through the openings 63.

Brackets 65 are pivoted on the pintle rod 64, and are also pivoted to each other by means of pintle rods 66. A support 67 having a bearing member 68 thereon is provided with a pintle rod 69.

One end of the brackets 65 is pivoted to the pintle rod 69. A collar and set screw 70 is slidably mounted on the pintle rod 69 whereby the brackets 65 may be raised or lowered on the bearing member 68 for varying the height of the machine.

In Figs. 2 and 3 I have shown the machine suspended from an over head track device, and in this form of device 71 indicates a track upon which are slidably mounted roller devices 72.

Links 73 are fixed to the roller devices 72 and have hingedly fixed to their lower ends a block or movable member 74.

A pair of straps 75 are fixed to the block 74. Straps 76 are received between the sides of the straps 75 and are connected together by means of bolts 77 which extend through registering openings 78 in the straps 75 and 76.

The straps 75 are provided with a number of openings 78 as are the straps 76 so that adjustment may be had.

In this form of device an auxiliary frame 79 is formed on the upper end of the frame A. Bolts 80 connect the two sides of the auxiliary frame together. Fixed to the bolts 80 are the arms 81 which meet at their upper end and rest against the sides of the straps 76.

The arms 81 are provided with openings which register with the openings 78 so that bolts 77 may be extended therethrough for fastening the straps 76 to the arms 81.

From the construction of the parts just described it will be seen that the entire machine may be shifted longitudinally on the track, or may be swung on a horizontal axis due to the hinged connection between the link 73 and the movable member or block 74.

In Fig. 2 I have shown a registering device 82 on the wall 11 of the frame. In order to trip the registering device, I have provided a pair of pins 83 shown in dotted lines on the disk 43, which with each revolution of the disk 43 strike against the registering device 82 and cause it to be tripped.

In Fig. 10 I have shown a portable machine which includes a wheel mounted frame B. The frame B consists of uprights 84, 85, 86 and 87. Each of the uprights are provided with caster wheels 88. Reinforcing rods 89 connect the uprights together for forming a rigid frame.

A vat 90 is mounted on the uprights 84, 85 and 86. A band 91 extends around the vat 90 and has fixed to it a cap 92 by means of the bolts 93, as shown in Figs. 10 and 11 of the drawings. There are two caps 92 provided. The caps 92 rest over the upper end of the uprights 85 and 86.

The upright 84 is comparatively short and rests against the bottom of the vat 90. The upper end of the upright 84 is received in a socket 94 which is fixed to the vat 90.

It will be seen that the vat 90 is mounted to one side of the frame. The purpose of mounting the vat in such position on the frame will be hereafter more fully set forth.

The upright 87 is comparatively high and extends above the upper edge of the vat 90, and is provided with a series of openings 95. A collar 96 is slidably mounted on the upright 87 and is provided with an opening 97 which may register with any of the openings 95.

By placing a pin through the openings 97 and 95 the collar 96 may be locked in any desired position.

Pivotally mounted on the upright 87 above the collar 96 is one end of the bracket 65. The doughnut forming and cutting machine is mounted on the opposite end of the bracket 65.

It will be seen that the doughnut forming and cutting machine is mounted on the opposite side of the frame from the vat 90. This makes the vat 90 act as a counter weight for the doughnut forming and cutting machine, which may be swung to various positions. The doughnut forming and cutting machine may be swung over the vat 90 so that dough from the vat 90 may be placed in the hopper 29 of the machine.

After the hopper 29 has been filled with dough then the machine is swung over a vat which is filled with hot grease and the dough is pressed through the die into the hot grease in the form of doughnuts.

The vat 90 and the doughnut forming and cutting machine act as counter weights for each other so that the frame B may be made comparatively light and yet always retain its balance.

By adjusting the collar 96 the vertical positioning of the forming and cutting machine may be varied as is desired.

It will be seen that I have provided a machine designed to be used under almost any conditions and which may readily and easily be adjusted to many positions where the machine will best operate.

The advantage of the portable machine can readily be seen since I am able to move the dough containing vat and the forming and cutting machine from place to place making it possible to use one forming and cutting machine in connection with a great number of kettles containing hot grease.

I am able also to move the vat away from the hot grease so as to prevent the dough which must remain at a certain consistency from becoming partially cooked before being passed into the forming and cutting machine. This makes the portability a very desirable feature of my device.

It will be noted that my device can readily and easily be cleaned, can be adjusted to various positions, can be geared so as to operate at various speeds and can be successfully used under almost any condition.

Some changes may be made in the construction and arrangement of the parts of my machine without departing from the real spirit and purpose of my invention, and it is my intention to cover by my claims, any modified forms of structure or use of mechanical equivalents, which may be reasonably included within their scope.

I claim as my invention:

1. A doughnut forming and cutting machine including a frame, a die detachably mounted on said frame, corrugated drums journaled in said frame and having their axes geared together for operation simultaneously, a crank for rotating said drums, a reciprocating cutter device mounted on said frame adapted to strike against the lower edge of the die on its cutting stroke, and a dough cutoff device slidably mounted in said frame for preventing dough from passing into said die when the machine is not in operation.

2. A doughnut forming and cutting machine having a crank thereon, a fender below said crank for preventing heat from coming in contact with the arm of the operator and a cutoff device for preventing any dough from leaving the machine, said cutoff device having a handle thereon extended through the fender whereby it may be moved to open or closed position.

3. A doughnut forming and cutting machine having a crank thereon, a fender below said crank for preventing heat from coming in contact with the arm of the operator and a cutoff device for preventing any dough from leaving the machine, said fender being provided with a slot, a handle on one end of said cutoff device, said handle being extended through said slot whereby a bearing for one end of the cutoff is provided.

4. A doughnut forming and cutting machine, a frame having a pair of drums journaled therein, a die below said drums, a removable wall member in said frame between the die and the drums, said wall including a plate, a spring fixed to said plate and having its free end fixed to said frame and stops on said frame for limiting the movement of said plates in one direction, the parts being so arranged that the spring holds the plate in position.

5. A doughnut forming and cutting machine, a frame having a pair of drums journaled therein, a die below said drums, a removable wall member in said frame between the die and the drums, said wall including a plate, a spring fixed to said plate and having its free end fixed to said frame and stops on said frame for limiting the movement of said plates in one direction, the parts being so arranged that the spring holds the plate in position, and a cutter device adapted to pass over the edge of the die for cutting the dough therefrom.

6. A doughnut forming and cutting machine, a frame having a pair of drums journaled therein, a die below said drums, a removable wall member in said frame between the die and the drums, said wall including a plate, a spring fixed to said plate and having its free end fixed to said frame and stops on said frame for limiting the movement of said plates in one direction, the parts being so arranged that the spring holds the plate in position, a cutter device, means for intermittently operating said cutter device for cutting the dough from the die as and for the purposes stated.

7. In a device of the class described, a frame, a hopper on said frame, a die on said frame, means for forcing dough or the like through said die, said means comprising a pair of drums geared together, a crank for operating said drums, removable walls between said die and said drums, a shoulder formed on the bottom of the frame for receiving one end of the wall, a spring fixed to each of said walls near the upper end thereof and having its free end fixed to the bottom of said frame, stop members for holding the wall in one position, the parts being so arranged that spring holds the wall in position.

8. In a device of the class described, a portable frame, a vat removably mounted on said frame, a doughnut forming and cutting machine rotatably mounted on said frame, the parts being so arranged that the doughnut forming and cutting machine may be swung over said vat for filling said machine with dough and swung away from said vat when cutting doughnuts.

9. In a device of the class described, a portable frame, a vat removably mounted on said frame, a doughnut forming and cutting machine rotatably mounted on said frame, and means for varying the vertical position of said machine with relation to the frame, the parts being so arranged that the doughnut forming and cutting machine may be swung over said vat for filling said machine with dough and swung away from said vat when cutting doughnuts.

10. In a device of the class described, a portable frame, a vat mounted on said frame to one side thereof, a doughnut forming and cutting machine rotatably mounted on said frame, the parts being so arranged that the vat acts as a counter weight when the machine is swung away from the vat when cutting doughnuts.

11. In a device of the class described a frame, a vat mounted on said frame, said vat being placed to one side thereof, a doughnut forming and cutting machine mounted on said frame, said doughnut forming and cutting machine being placed on the opposite side of the vat whereby the weight will be substantially equally distributed upon said frame.

12. In a device of the class described a frame, a vat mounted on said frame, said vat being placed to one side thereof, a doughnut forming and cutting machine mounted on said frame, said doughnut forming and cutting machine being placed on the opposite side of the vat whereby the weight will be substantially equally distributed upon said frame, the parts being so arranged that said machine may be swung over said vat or away from it as desired and the entire device always hold its balance.

13. In a device of the class described a frame, a vat mounted on said frame, said vat being placed to one side thereof, an arm pivoted to said frame and capable of vertical adjustment thereon, a doughnut forming and cutting machine pivoted to said arm, the parts being so arranged that the vat acts as a counter weight when said machine is swung away from said vat.

14. In a device of the class described a portable frame, a vat removably mounted on said frame, said vat being placed to one side thereof, a doughnut forming and cutting machine mounted on said frame, said doughnut forming and cutting machine being placed on the opposite side of the vat whereby the weight will be substantially equally distributed upon said frame, the parts being so arranged that said machine may be swung over said vat or away from it as desired and the entire device always hold its balance.

Des Moines, Iowa, December 30, 1920.

AUGUST SCHOEL.